(12) United States Patent
McGough (10) Patent No.: US 6,209,252 B1
(45) Date of Patent: Apr. 3, 2001

(54) DUAL SCENT DISPENSING APPARATUS AND METHOD

(76) Inventor: Alvin B. McGough, 3132 E. Republican Rd., Cabot, AR (US) 72023

( * ) Notice: Subject to any disclaimer, the term of this patent is extended or adjusted under 35 U.S.C. 154(b) by 0 days.

(21) Appl. No.: 09/032,462

(22) Filed: Feb. 27, 1998

Related U.S. Application Data (63) Continuation-in-part of application No. 08/547,403, filed on Oct. 24, 1995, now abandoned.

(51) Int. Cl.[7] .................................................. A01M 31/00
(52) U.S. Cl. ................................................................ 43/1
(58) Field of Search ............................ 43/1; 239/36, 44, 239/47, 58; 222/175, 187

(56) References Cited

U.S. PATENT DOCUMENTS

| | | |
|---|---|---|
| 4,506,806 | 3/1985 | Lincoln et al. ....................... 222/175 |
| 4,667,430 | 5/1987 | Ziese, Jr. ....................... 43/1 |
| 4,773,177 | 9/1988 | Gray, II et al. ............................ 43/1 |
| 4,944,940 | 7/1990 | Christenson, II ....................... 424/84 |
| 4,953,763 | 9/1990 | Kierum et al. ....................... 222/644 |
| 4,989,547 | 2/1991 | Eaton ................................. 119/51.11 |
| 5,161,646 | 11/1992 | Aurich et al. ......................... 222/187 |
| 5,183,259 | 2/1993 | Lyon ..................... 273/418 |
| 5,279,062 | 1/1994 | Burgeson ................................. 43/1 |
| 5,299,376 | 4/1994 | Roberts ...................................... 43/2 |
| 5,303,496 | 4/1994 | Kowalkowski .......................... 43/1 |

Primary Examiner—Kurt Rowan
(74) Attorney, Agent, or Firm—J. Charles Dougherty

(57) ABSTRACT

A dual scent dispensing apparatus and method employing separate individually metered reservoirs for holding rutting buck scent and estrus doe scent is disclosed. The scents are dispensed dripwise from each reservoir, at a rate that may be set individually for each of the scents. The rate may be controlled by separate timers which activate separate solenoids, or may be achieved by pinching the drip tubes through which the scent is dispensed by means of a control button on the front of the apparatus enclosure.

9 Claims, 5 Drawing Sheets

DUAL SCENT DISPENSING APPARATUS AND METHOD

The present application is a continuation-in-part application of application Ser. No. 08/547,403, filed Oct. 24, 1995, which is considered as being part of the disclosure of the present application and is hereby incorporated by reference herein.

BACKGROUND OF THE INVENTION

1. Field of the Invention

The present invention is generally directed to hunting aids and more particularly to devices for dispensing scents for the attraction of game animals.

2. Description of the Prior Art

Game animals, such as deer and the like, are known to be attracted by certain scents classified generally as pheromones. By using scents that attract the attention of game animals, the animals may be drawn to a location selected by the hunter.

A great deal of attention has therefore been focused on producing and dispensing scents that are effective in attracting game animals. Numerous formulas have been suggested for scents to attract deer. Some formulas use the urine of ruminants, such as cattle, goats and the like, while others use natural deer urine. Glandular secretions from various deer glands, such as tarsal and interdigital glands, produce powerful attractant scents. Particularly attractive to bucks are the scents produced by a doe in estrus. Typical of the scent formulas to attract deer is that disclosed in U.S. Pat. No. 4,944,940 issued to Christenson on Jul. 31, 1990 for "Buck Lure." Christenson discloses a Buck Lure comprising a deer tarsal gland and a fluid in which the predominant ingredient is deer urine. Other ingredients in the formula include deer interdigital gland, deer femoral gland and a preservative.

The distribution of the appropriate scent formula into a hunting area so as to attract deer presents a major problem in that the presence of the hunter may produce a scent which offsets the attractive scent. Accordingly, considerable effort has been expended on methods and devices to distribute a deer attractant scent in a manner that minimizes interaction of the hunter with the environment. One solution to this problem is to distribute the scent by a projectile of some type. U.S. Pat. No. 5,183,259 to Lyon discloses an arrow having a reservoir capable of containing a fluid. An appropriate liquid scent may be placed in the reservoir which then may be dispersed into the hunting area by the hunter without the hunter being required to closely approach the selected area. A similar scent distributing method is disclosed in U.S. Pat. No. 5,303,496 to Kowalkowski. Kowalkowski discloses a method for distributing a scent carried in a pellet and projected by a carbon dioxide operated gun.

More common devices for dispersing animal attractant scents rely on placing a reservoir in a suitable location where the scent is dispersed gradually or at intervals over an extended period of time. The hunter is only required to make one trip to the selected hunting area, after which the scent dispersal continues automatically for an extended period of time without direct intervention by the hunter. There are various categories of such devices, each of which employ differing methods to disperse the scent.

One form of scent dispersal device employs a heated wick which draws the liquid scent from a reservoir and disperses it as a heated vapor. An example of this type of device is disclosed in U.S. Pat. No. 5,161,646 to Aurich, et al.

Another type of device employs a capillary tube to produce a controlled drip from a liquid scent reservoir. Such a device is disclosed in U.S. Pat. No. 4,667,430 issued to Ziese, Jr. Another type of drip device uses the same technique as a plasma drip to assure a slow steady release of the liquid scent. For example, U.S. Pat. No. 4,773,177 to Gray II, et al. discloses a liquid lure dispenser comprising a vial of liquid animal lure in communication with a micro-drip chamber.

One problem involved in any type of scent dispensing apparatus is to assure an even distribution of the scent. Changes in ambient temperature can affect the rate at which an automatic dispenser releases scent. U.S. Pat. No. 5,279,062 to Burgeson discloses a device which is regulated according to ambient temperature. A somewhat more sophisticated approach uses a timer to precisely control distribution of the scent. U.S. Pat. No. 4,989,547 to Eaton discloses a dispenser having a motor for centrifugally dispersing a scent under the control of a timer. Timers have also been employed to operate the drip type dispenser such as the device disclosed in U.S. Pat. No. 4,953,763 issued to Kierum, et al. and U.S. Pat. No. 5,299,376 to Roberts.

The most powerful attractant scents tend to be associated with the rutting season which usually occurs in late fall. Bucks mark their territory by depositing scents in areas known as "scrapes." The scrapes are formed by the buck pawing the ground to remove leaf litter, after which the buck scent is deposited from urine and glandular secretions. The scent of the buck in rut is attractive to passing does, if in estrus.

Does in estrus then signal their readiness and availability for mating by depositing their own scent on the scrape. Bucks check the scrapes regularly for estrus doe scent and if the appropriate scent is detected, the buck trails the doe for mating.

By making a scrape themselves or using an existing scrape, hunters hope to stimulate an aggressive response in rutting bucks. By combining the scents of a rutting buck and the scent of an estrus doe, the dominant buck in an area is likely to be led to believe that receptive does and intrusive bucks are present in its territory. The combination is thought to be extremely effective in stimulating the aggressive tendencies of the dominant buck and therefore works as a powerful attractant.

SUMMARY OF THE INVENTION

Although the scent of rutting bucks and estrus does are both available commercially, either as separate commodities or combined in a single formula, the inventor of the present invention is unaware of any prior art allowing each scent to be individually and separately dispersed at the optimum rate. The present invention is directed to a method and apparatus for dispersing the scents of rutting bucks and estrus does from separate individually metered reservoirs.

The present invention employs a reservoir for holding rutting buck scent and a reservoir for holding estrus doe scent. The scents are dispensed dripwise from each reservoir. In one embodiment of the invention, the rate of dispensing is controlled by individual solenoids which hold flexible drip tubes compressed to prevent dispensing until signalled to retract and release scent from each drip tube. The solenoids may be controlled by electronic timers which set the rate of activation of each solenoid to dispense scent from each reservoir at individually predetermined rates. In a second embodiment, the rate of dispensing is controlled by manual slides on the exterior of the dispenser that affect each drip tube individually. In either case, it is therefore possible to release one scent at a different rate than the other scent.

Since the solenoids are held closed by spring biasing means until the timers signal the release of scent, little electrical power is required to operate the invention. Therefor, only battery power is required for maintaining the invention in an active state for an extended period of time, typically weeks. This is advantageous to avoid frequent visits to the site of the scrape by the hunter, which inevitably leaves the scent of the hunter in the vicinity and discourages the appearance of bucks. The invention is intended to be disposed above the scrape by hanging straps or similar means.

The invention may be hung over a scrape inside an insulated cloth bag which protects the device from the elements. The cloth bag also helps keep the rutting buck scent and estrus doe scent liquids from freezing during cold winter conditions. In addition, additives may be mixed with the rutting buck scent and estrus doe scent liquids to help prevent freezing.

It is thus an object of the present invention to provide for the separate individually metered release of rutting buck scent and estrus doe scent.

It is a further object of the present invention to provide for controllable and variable release rates for each scent.

It is an additional objection of the present invention to provide for the dispersion of both scents from a device having a reliable drip release mechanism and low usage of electrical power.

It is another object of the present invention to provide for dual scent reservoirs having a simple refill mechanism.

It is still another object of the present invention to provide a scent dispenser in which the scent liquids do not freeze during cold winter conditions.

Other objects and advantages of the present invention will be apparent from a consideration of the following detailed description of the preferred embodiments in conjunction with the appended drawings as described following:

DETAILED DESCRIPTION OF THE PREFERRED EMBODIMENTS

The scent of rutting bucks and estrus does are both available commercially, either as separate commodities or combined in a single formula, usually with various additives such as extracts from deer glands. The prior art recognizes various methods and devices to release the commercially available scents to the environment. However, the prior art is directed to the release of a single scent or formula. The inventor of the present invention is unaware of any prior art allowing each scent to be individually and separately dispersed at the optimum rate. The present invention is directed to a method and apparatus for dispersing the scents of rutting bucks and estrus does from separate individually metered reservoirs.

Figure 5:
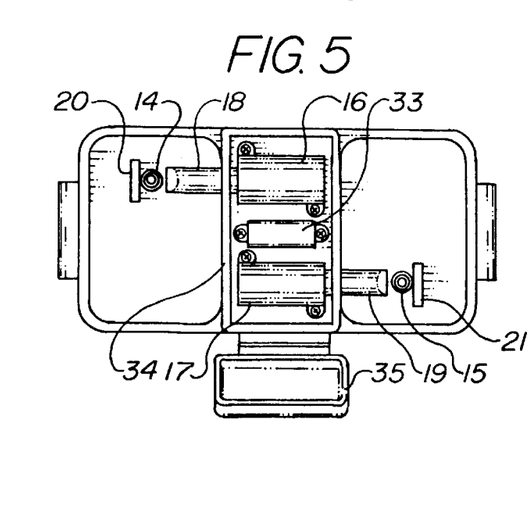
FIG. 5 is a bottom plan view of a first preferred embodiment of the invention with the solenoid compartment open.
Figure 6:
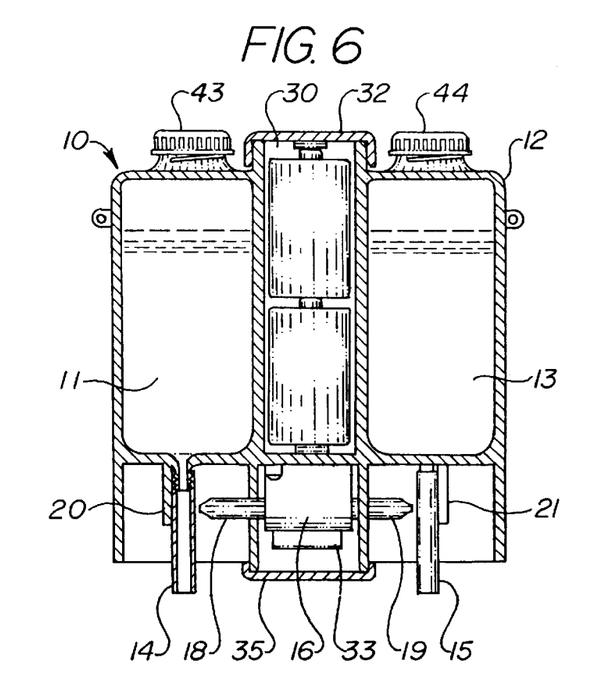
FIG. 6 is a sectional front elevation view of a first preferred embodiment of the present invention.
Figure 7:
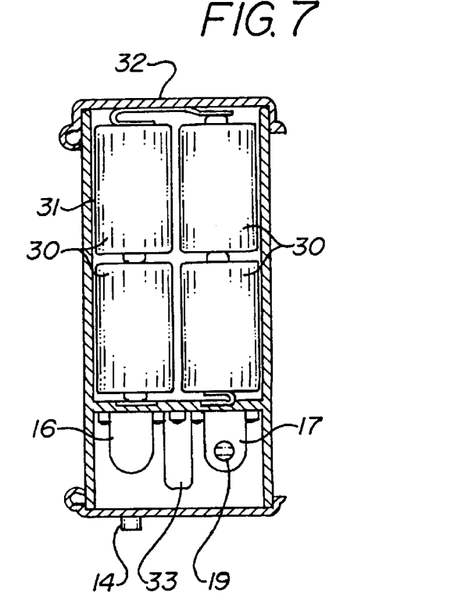
FIG. 7 is a sectional side elevation view of a first preferred embodiment of the present invention.

As may be described with reference to FIGS. 5, 6, and 7, a first preferred embodiment of the present invention employs a reservoir 10 for holding rutting buck scent 11 and a reservoir 12 for holding estrus doe scent 13. The scents 11, 13 are dispensed drip-wise from each respective reservoir 10, 12 through drip tubes 14, 15 respectively, which communicate with each reservoir 10, 12. The drip tubes 14, 15 are disposed in the bottoms of the respective reservoirs 10, 12 so that the scents 11, 13 are naturally dispensed gravitationally whenever the drip tubes 14, 15 are open and unimpeded. The drip tubes 14, 15 are formed of silicon rubber which has the desirable characteristics for the most effective functioning of the invention. The drip tubes 14, 15 should be flexible to ensure complete closure when held closed by the shafts 18, 19. The drip tubes 14, 15 must also be free of any tendency to remain closed when the pressure of the shafts 18, 19 is removed. The disclosed type of silicon rubber has been found to exhibit these desirable characteristics.

The drip tubes 14, 15 are normally held closed by shafts 18, 19, which compress the drip tubes 14, 15 against stops 20, 21, respectively. When compressed, the drip tubes 14, 15 do not allow the dispensing of the scents 11, 12. The shafts 18, 19 are normally biased closed by biasing means such as springs (not shown). The biasing means may be incorporated in solenoids 16, 17 which, when activated, withdraw the shafts 18, 19 so as to allow the drip tubes 14, 15 to dispense the scents 11, 13, but normally bias the shafts 18, 19 closed. Such solenoids which incorporate biasing means are commercially available and are well known in the art.

The rate of dispensing of each scent 11, 13 is controlled by timing the opening of the solenoids 16, 17 which hold the flexible drip tubes 14, 15 compressed to prevent dispensing until signalled to retract and release scent from each drip tube 14, 15. The solenoids 16, 17 are controlled by electronic timers which set the rate of activation of each solenoid 16, 17 to dispense scent 11, 13 from each reservoir 10, 12 at individually predetermined rates. Electronic circuits which incorporate timers and which have the capability to operate solenoids on preset time schedules are conventional and well known in the art. For the practice of the present invention two separate timers are required to allow the release of scent at individually variable rates.

The rate of dispensing of each scent may be adjusted both by altering the number of times the solenoids 16, 17 are activated within a given time period and by setting the interval of time during which the solenoids 16, 17 allow the drip tubes 14, 15 to be open. When the drip tubes 14, 15 are open, they tend to release the liquid scent at a natural rate determined by the viscosity of the fluid, the diameter of the drip tubes, and other factors. For example, holding a drip tube open for 1 second may allow 3 drops of scent to be dispensed. It is therefor possible to precisely determine the rate of release of a particular scent. It is also possible to release one scent at a different rate than the other scent.

Figure 4:
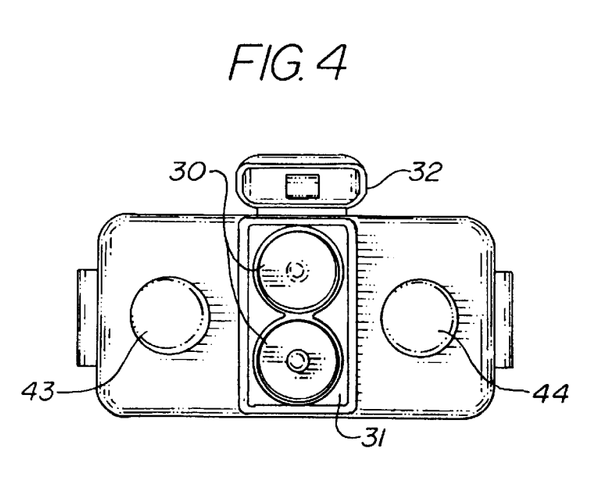
FIG. 4 is a top plan view of a first preferred embodiment of the invention with the battery compartment open.

Since the solenoids 16, 17 are held closed by biasing means until the timers signal the release of scent, little electrical power is required to operate the invention. Therefor, only battery power is required for maintaining the invention in an active state for an extended period of time, typically weeks. This is advantageous to avoid frequent visits to the site of the scrape by the hunter, which inevitably leaves the scent of the hunter in the vicinity and discourages the appearance of bucks. The invention is intended to be disposed above the scrape by hanging straps or similar means. As may be seen with reference to FIGS. 4, 6 and 7, batteries 30 are disposed within a battery storage compartment 31 which is accessible by a battery storage compartment door 32. The batteries 30 are electrically connected to the timer module 33. The timer module 33 is in turn electrically connected to the solenoids 16, 17. The timer module 33 and the solenoids 16, 17 are disposed within a solenoid compartment 34 which is accessible by a solenoid compartment door 35. While the solenoids should require infrequent maintenance in practice, occasional replacement may be required. Therefore, ease of access to the solenoids is desirable.

Figure 2:
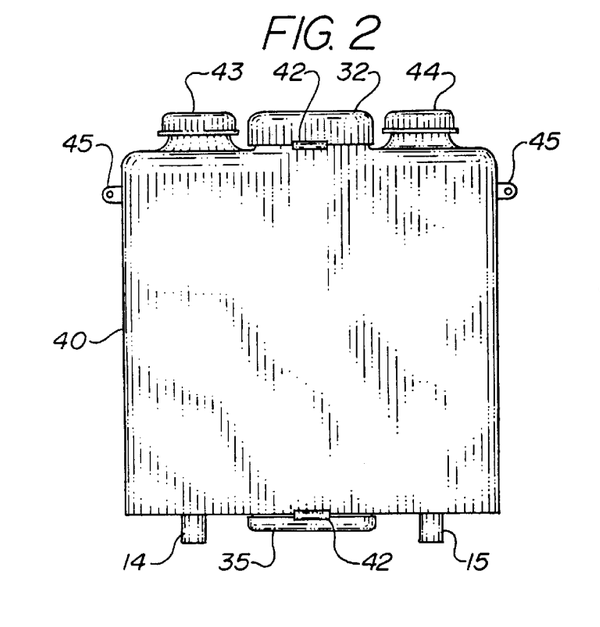
FIG. 2 is a front elevation view of a first preferred embodiment of the present invention.
Figure 3:
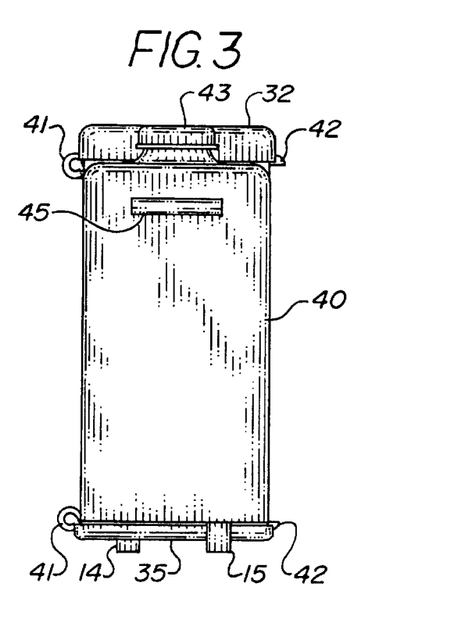
FIG. 3 is a side elevation view of a first preferred embodiment of the present invention.

The components of the present invention are preferably combined in a compact package. In the first preferred embodiment, all major components, such as the reservoirs 10, 11, the battery storage compartment 31, and the solenoid storage compartment 34 are formed in a monolithic package of a suitable weather resistant material, such as molded plastic. With reference to FIGS. 2 and 3, an enclosure 40 comprises the reservoirs 10, 11, the battery storage compartment 31, and the solenoid storage compartment 34. As described, access to the battery storage compartment 31 is through battery storage compartment door 32 and access to the solenoid storage compartment 34 is through solenoid storage compartment door 35. Molded-in hinges 41 and catches 42 may readily be employed when the entire enclosure is of monolithic molded construction.

Figure 1:
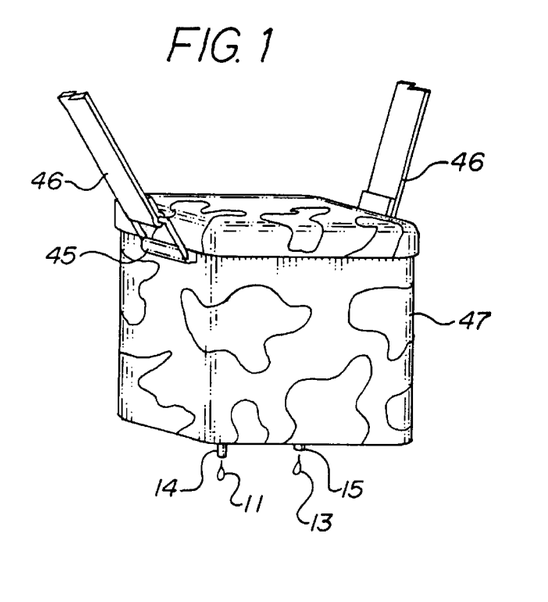
FIG. 1 is a perspective view of a first preferred embodiment of the present invention disposed within a camouflage case with hanging straps.

Access to reservoirs 10, 12 is preferably through screw caps 43, 44. Additionally, the enclosure 40 is provided with lugs 45 for attachment to hanging straps 46 as shown in FIG. 1. Also with reference to FIG. 1, the deployment of a device of the present invention over an artificially prepared scrape may be described. The enclosure 40 is preferably camouflaged or placed within a camouflage cover 47. The device may be hung from a tree or other convenient object from the hanging straps 46. The timing, including frequency and duration of release of each scent 11, 13 is set by the user. The scent 11, 13 are then released according to schedule through the drip tubes 14, 15. The user need not return to the device until the reservoirs 10, 12 are empty or until the batteries 30 have expired. As noted above, the device requires little electrical power on a continuous basis and therefore requires infrequent battery replacement.

A second preferred embodiment of the invention may be described with reference to FIGS. 8, 9, 10, and 11. This embodiment of the invention employs a reservoir 50 for holding rutting buck scent 56 and a reservoir 54 for holding estrus doe scent 52. Unlike the first embodiment, enclosure 62 is formed separately from reservoirs 50, 54, and reservoirs 50, 54 are mounted on top of enclosure 62. The scents 56, 52 are dispensed drip-wise from each respective reservoir 50, 54 through drip tubes 58, 60 respectively. Drip tube 58 extends from the bottom of reservoir 50, through an opening in the top of enclosure 62, and then extends out of the side of enclosure 62 opposite the side nearest reservoir 50. Likewise, drip tube 60 extends from the bottom of reservoir 54, through an opening in the top of enclosure 62, crosses with drip tube 58 in the middle of enclosure 62, and then extends out of the side of enclosure 62 opposite the side nearest reservoir 54. The drip tubes are formed of silicon rubber.

Figure 12:
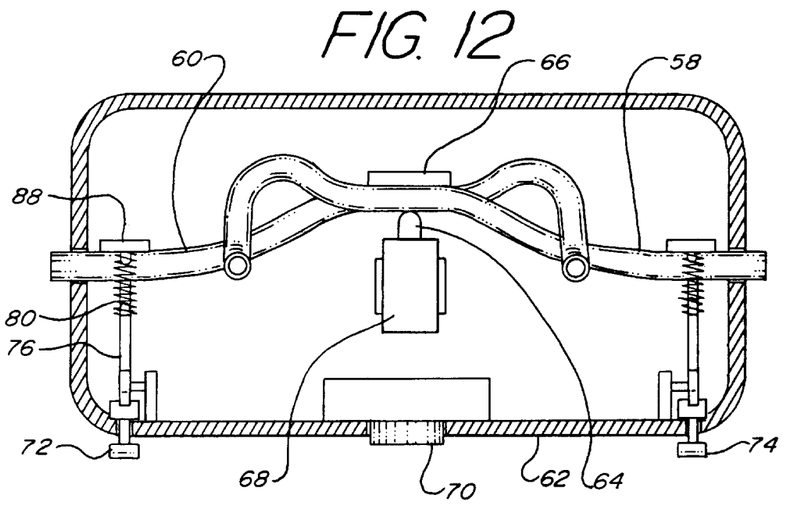
FIG. 12 is a sectional top view of a second preferred embodiment of the invention.
Figure 13:
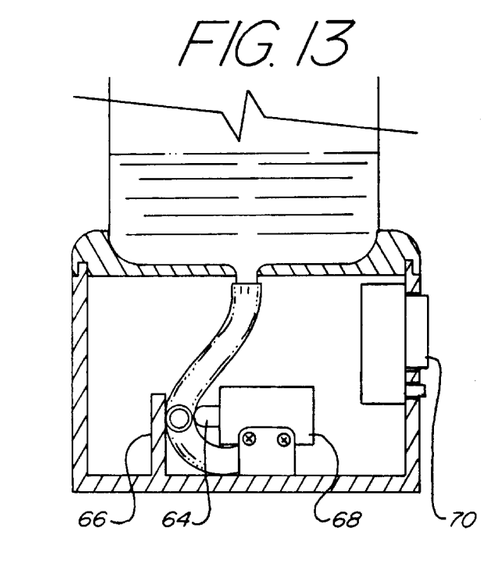
FIG. 13 is a sectional side elevation view of a second preferred embodiment of the present invention showing the solenoid in the open position.
Figure 14:
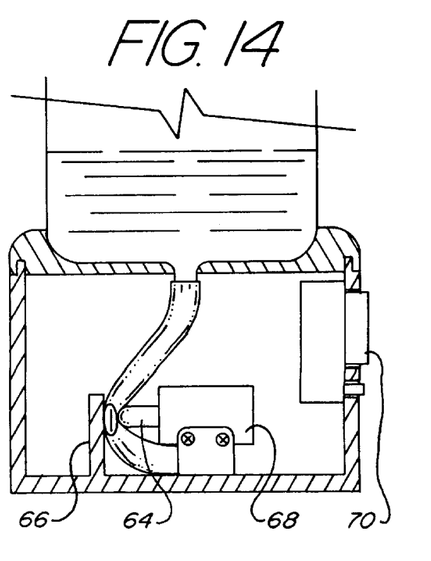
FIG. 14 is a sectional side elevation view of a second embodiment of the present invention showing the solenoid in the closed position.

Referring now to FIGS. 12, 13, and 14, the drip tubes 58, 60 are normally held closed by shaft 64, which compress the drip tubes 58, 60 against stop 66. When compressed, the drip tubes 58, 60 do not allow the dispensing of the scents 56, 52. The shaft 64 is normally biased closed by biasing means such as springs (not shown). The biasing means may be incorporated in solenoid 68 which, when activated, withdraws the shaft 64 so as to allow the drip tubes 58, 60 to dispense the scents 56, 52 but normally biases the shaft 64 closed. Such solenoids which incorporate biasing means are commercially available and are well known in the art. It is important to note that, unlike the first preferred embodiment of the invention, this embodiment does not use a solenoid to control the rate of release of scents, but rather uses solenoid 68 as a means to activate or deactivate the device. The means for controlling the rate of release of scents 56, 52 when solenoid 68 is activated is described below.

Solenoid 68 may be powered by a battery system (not shown) similar to that described with respect to the first preferred embodiment of the invention. Solenoid 68 may be operated through a direct manual control as is well known in the art (not shown), or may be activated and deactivated through the operation of timer 70. Timer 70 will allow the operator to begin the flow of scents 56, 52 at a predetermined time in the future, after the operator's human scent in the area of the device has diminished. Alternatively, timer 70 may be operated through a remote control receiver and transmitter (not shown) to avoid the presence of human smell near the site of the scent dispenser if manual operation were performed.

Figure 15:
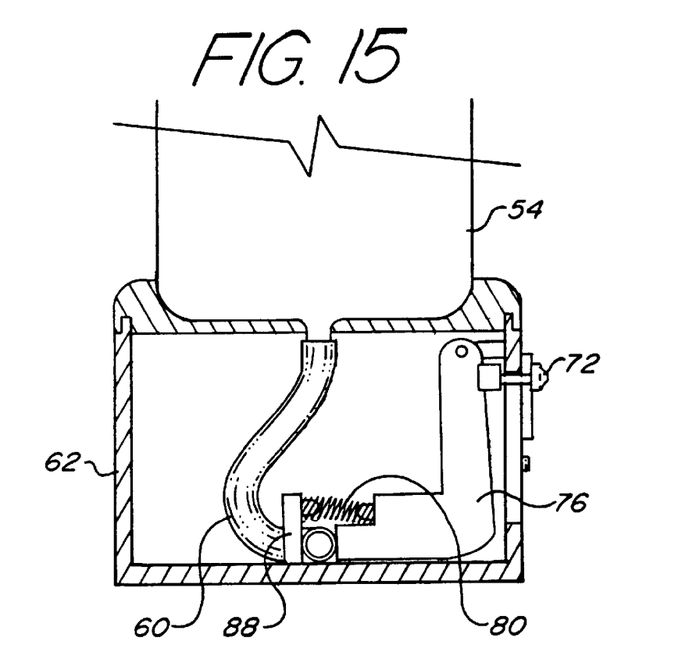
Figure 16:
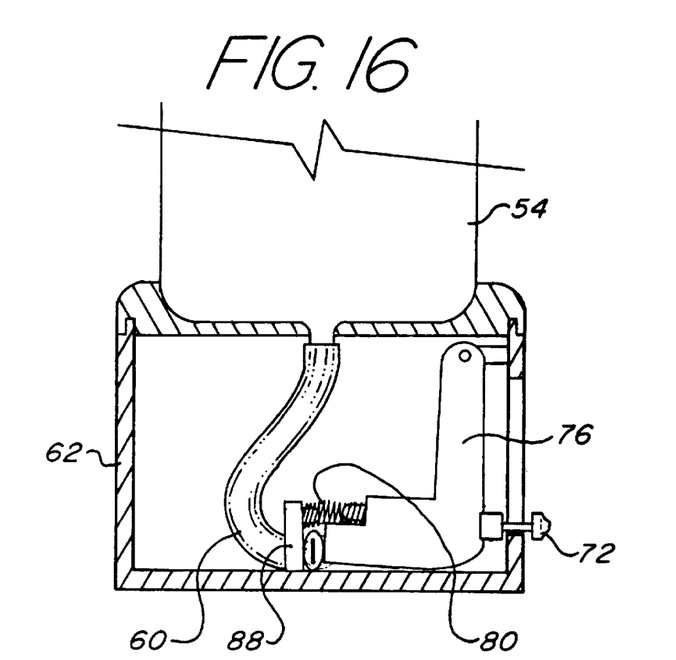

Referring now to FIGS. 15 and 16, the method of controlling the rate of dispensing of each scent 56, 52 may be described. Sliding buttons 72, 74 pass through slots in the front of enclosure 62 such that they may be raised and lowered manually from the outside of enclosure 62. Sliding buttons 72, 74 contact slidebars 76, 78, respectively, which are hinged at the top to enclosure 62. Slidebars 76, 78 are biased back toward the front of enclosure 62 by springs 80, 82. The lower portion of slidebars 76, 78 extends along the bottom of enclosure 62.

To adjust the rate of dispensing of each scent, sliding buttons 72, 74 may be adjusted by moving them up or down inside the slots in enclosure 62. For example, suppose the highest rate of dispensing for estrus doe scent 52 is desired. The operator would move sliding button 72 to the highest position within the slot in enclosure 62. Spring 80 would thus bias slidebar 76 toward the front of enclosure 62 as shown in FIG. 15. In this position, drip tube 60 would be fully open and would allow estrus doe scent 52 to flow at the maximum rate possible.

If a lower rate of dispensing estrus doe scent 52 is desired, the operator may push sliding button 72 toward the bottom of enclosure 62, as shown in FIG. 16. This action causes slidebar 76 to pivot backward about its hinged connection with enclosure 62 and thereby push against drip tube 60. Because drip tube 60 is compressible, the force of slidebar 76 pushing against drip tube 60 causes drip tube 60 to pinch and thereby allow a smaller volume of estrus doe scent 52 to pass through drip tube 60 per unit time. If sliding button 72 is moved to its lowest position, such action will pinch drip tube 60 completely closed and no estrus doe scent 52 will pass through drip tube 60. The control of the rate of dispensing of rutting buck scent 56 is performed in a likewise manner using sliding button 74.

It should be noted that since the rate of dispensing rutting buck scent 56 and estrus doe scent 52 are set separately by sliding buttons 74, 72 respectively, the operator may adjust the relative volume of scents dispensed per unit time as desired. The operator may thereby create a proportion of scents optimized for any particular set of conditions the operator encounters.

Figure 8:
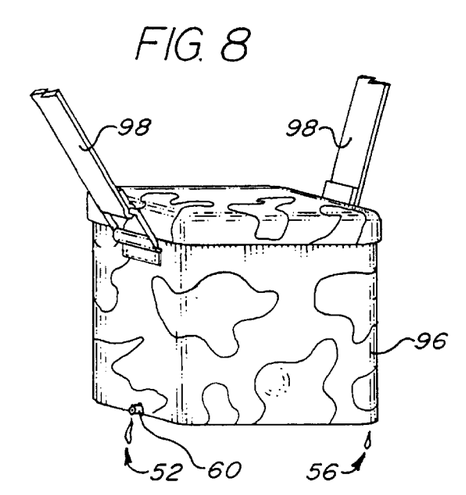
FIG. 8 is a perspective view of a second preferred embodiment of the present invention disposed within a camouflage case with hanging straps.
Figure 9:
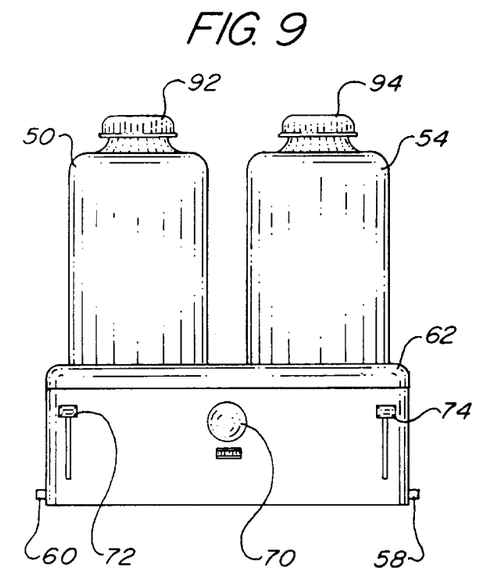
FIG. 9 is a front elevation view of a second preferred embodiment of the present invention.
Figure 10:
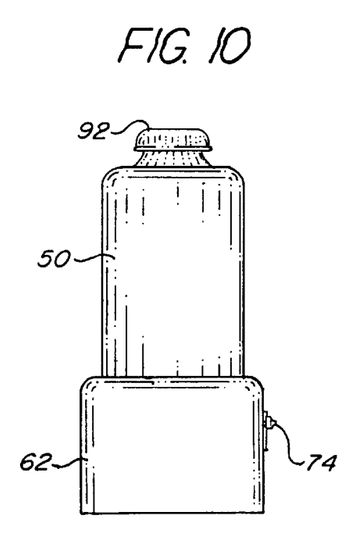
FIG. 10 is a side elevation view of a second preferred embodiment of the present invention.
Figure 11:
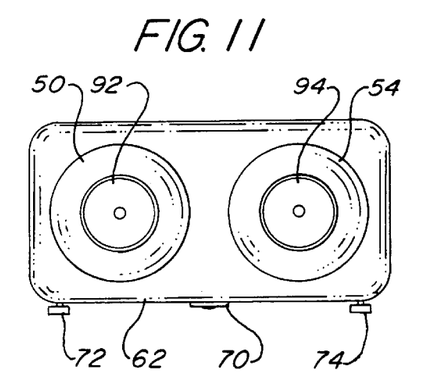
FIG. 11 is a top plan view of a second preferred embodiment of the invention.

Referring again to FIGS. 9, 10, and 11, access to reservoirs 50, 54 is through screw caps 92, 94 respectively. Enclosure 62 and attached reservoirs 50, 54 may be disposed within protective bag 96 as shown in FIG. 8. Protective bag 96 is preferably insulated to help prevent the freezing of the rutting buck scent 56 and estrus doe scent 52 within the device during cold weather. Alternatively or additionally, antifreeze additives may be includes in the formulation of rutting buck scent 56 and estrus doe scent 52 to prevent freezing. Protective bag 96 may be hung from a tree or other convenient object using hanging straps 98 which are attached to protective bag 96. Protective bag 96 may preferably be opened from the top, using a snap closure, zipper closure, or the like, to refill reservoirs 50, 54 or to otherwise operate the device. Protective bag 96 may be camouflaged if desired.

The present invention has been described with reference to certain preferred and alternative embodiments which are exemplary only and not intended to exclude certain variations and modifications which would occur to those skilled in the art nor should the embodiments disclosed herein be considered as limiting to the full scope of the invention as set forth in the appended claims.

What is claimed is:

1. A device for attracting bucks by releasing scents, comprising:
   (a) a first reservoir containing the scent of a rutting buck;
   (b) a second reservoir containing the scent of a doe in estrus,
   (c) a compressible drip tube in communication with one of said reservoirs;
   (d) a compression stop located adjacent said drip tube and essentially immovable relative thereto;
   (e) a compression shaft movable between a first position compressing said drip tube against said compression stop whereby said scent is not released and a second position wherein said drip tube is essentially uncompressed and said scent is released drip-wise;
   (f) a resilient member for biasing said compression shaft in said first position;
   (g) timer means controlling operation of said compression shaft; and
   (h) solenoid means for moving said compression shaft to said second position in response to a signal from said timer means.

2. The device of claim 1 wherein said timer means comprises a solid state electronic timer circuit for generating a signal to said solenoid means, battery means for providing electrical power to said timer circuit and to said solenoid means, and manual control means for selecting an interval of operation of said solenoid means and a frequency of operation of said solenoid means.

3. The device of claim 1 further comprising a solenoid for moving said compression shaft to said second position.

4. The device of claim 3, further comprising a timer means, said timer means comprising:
   (a) a solid state electronic timer circuit for generating a signal to said solenoid;
   (b) a battery for providing electrical power to said timer circuit and to said solenoid; and
   (c) a manual control assembly for activating and deactivating said timer circuit.

5. The device of claim 3, further comprising a remote control means comprising:
   (a) a receiver communicatively connected to said solenoid; and
   (b) a remote transmitter whereby a signal may be sent to said receiver to activate and deactivate said solenoid.

6. A device for attracting bucks by releasing scents, comprising:
   (a) a first reservoir containing the scent of a rutting buck;
   (b) a second reservoir containing the scent of a doe in estrus;
   (c) a compressible drip tube in communication with one of said reservoirs:
   (d) an enclosure with a slot therethrough;
   (e) a button slideably extending through the slot in said enclosure;
   (f) a slidebar hingeably mounted to said enclosure and within said enclosure adjacent to said button;
   (g) a resilient member connected to said enclosure which biases said slidebar against said button; and
   (h) a compression stop mounted on said enclosure adjacent to said drip tube and opposite said slidebar, said compression stop being essentially immovable relative to said drip tube.

7. A device for attracting bucks, comprising:
   (a) an enclosure;
   (b) a reservoir mounted at least partially within said enclosure for holding one of the scent of a rutting buck and the scent of a doe in estrus;
   (c) a tube connected to said reservoir and passing through said enclosure for dispensing the scent from said reservoir;
   (d) a slidebar hingeably mounted within said enclosure and adjacent to said tube such that rearward movement of said slidebar will pinch said tube closed; and
   (e) a button slideably extending through a slot in said enclosure, and adjacent to said slidebar, such that movement of said button within the slot in said enclosure will cause said button to press against said slidebar, thereby causing said slidebar to move rearwardly and pinch said tube closed.

8. The device of claim 7, further comprising a spring biasing said slidebar away from said tube.

9. The device of claim 8, further comprising a compression stop mounted inside said enclosure adjacent to said tube and opposite said slidebar.

* * * * *

UNITED STATES PATENT AND TRADEMARK OFFICE
CERTIFICATE OF CORRECTION

PATENT NO.     : 6,209,252 B1
DATED          : April 3, 2001
INVENTOR(S)    : Alvin H. McGough It is certified that error appears in the above-identified patent and that said Letters Patent is hereby corrected as shown below:

<u>Title page,</u>
The inventor's middle initial should be "H."

Signed and Sealed this

Eleventh Day of December, 2001

Attest:

NICHOLAS P. GODICI
Attesting Officer — Acting Director of the United States Patent and Trademark Office